United States Patent [19]

Bentley et al.

[11] 4,232,135

[45] Nov. 4, 1980

[54] COATING COMPOSITIONS

[75] Inventors: John Bentley, Taplow; Morice W. Thompson, Maidenhead, both of England

[73] Assignee: Imperial Chemical Industries Limited, London, England

[21] Appl. No.: 972,899

[22] Filed: Dec. 26, 1978

[30] Foreign Application Priority Data

Jan. 10, 1978 [GB] United Kingdom ............... 871/78

[51] Int. Cl.³ .................. C08L 51/00; C08L 53/00; C08L 61/20; C08L 67/00
[52] U.S. Cl. .................................... 525/509; 525/78
[58] Field of Search ............... 260/850, 876; 525/78, 525/509, 428

[56] References Cited

U.S. PATENT DOCUMENTS

| | | | |
|---|---|---|---|
| 3,264,234 | 8/1966 | Osmond | 260/22 CB |
| 3,382,297 | 5/1968 | Thompson | 525/252 |
| 3,433,753 | 3/1969 | Farkas et al. | 260/22 CB |
| 3,514,500 | 5/1970 | Osmond et al. | 525/301 |
| 3,607,821 | 9/1971 | Clarke et al. | 260/33.6 R |
| 3,652,472 | 3/1972 | Clarke et al. | 525/921 |
| 3,661,835 | 5/1972 | Baker et al. | 260/29.1 R |
| 3,686,114 | 8/1972 | Thompson et al. | 260/29.1 R |
| 3,717,605 | 2/1973 | Osmond et al. | 260/29.2 R |
| 3,812,075 | 5/1974 | Burdett et al. | 525/518 |
| 3,857,810 | 12/1974 | Baker | 525/301 |
| 3,891,572 | 6/1975 | Moody et al. | 106/308 M |
| 3,925,295 | 12/1975 | Osborn et al. | 525/426 |
| 3,935,155 | 1/1976 | Osmond et al. | 260/31.2 R |
| 3,948,846 | 4/1976 | Waters | 525/299 |
| 3,981,839 | 9/1976 | Asher et al. | 525/450 |
| 3,985,700 | 10/1976 | Nicks et al. | 260/33.6 R |
| 4,007,306 | 2/1977 | Poy et al. | 260/856 |
| 4,025,471 | 5/1977 | Takahashi | 525/437 |
| 4,059,557 | 11/1977 | Bentley et al. | 528/336 |
| 4,101,520 | 7/1978 | Boldizar | 260/856 |
| 4,102,846 | 7/1978 | Bentley et al. | 260/31.2 N |

FOREIGN PATENT DOCUMENTS

| | | |
|---|---|---|
| 941305 | 11/1963 | United Kingdom . |
| 992637 | 5/1965 | United Kingdom . |
| 1052241 | 12/1966 | United Kingdom . |
| 1095288 | 12/1967 | United Kingdom . |
| 1108261 | 4/1968 | United Kingdom . |
| 1122397 | 8/1968 | United Kingdom . |
| 1156012 | 6/1969 | United Kingdom . |
| 1156653 | 7/1969 | United Kingdom . |
| 1231614 | 5/1971 | United Kingdom . |
| 1242054 | 8/1971 | United Kingdom . |
| 1319781 | 6/1973 | United Kingdom . |
| 1373531 | 11/1974 | United Kingdom . |
| 1403794 | 8/1975 | United Kingdom . |
| 1419199 | 12/1975 | United Kingdom . |
| 1453713 | 10/1976 | United Kingdom . |

*Primary Examiner*—Ronald W. Griffin
*Attorney, Agent, or Firm*—Cushman, Darby & Cushman

[57] ABSTRACT

A coating composition is provided in which the film-forming material consists of (a) 30–85% by volume of disperse phase particles of size 0.01–20 microns, of which not less than 50% are polymer microparticles, stably dispersed in (b) 70–15% by volume of a liquid continuous phase which is capable of curing by a condensation polymerization reaction, the total volume of components (a) and (b) being 100% and the disperse phase being capable of taking part in the curing reaction. The composition can have a very high solids content and makes possible the production of thick films free from surface shrinkage.

10 Claims, No Drawings

COATING COMPOSITIONS

This invention relates to coating compositions which cure by means of a condensation polymerisation reaction, more particularly to such compositions which have a high content of film-forming material and in which a substantial proportion of that material consists of polymer microparticles.

In the coatings art, there has in recent years been a marked interest in increasing as much as possible the proportion present in coating compositions of actual film-forming material, and hence of reducing the proportion of inert liquid diluents which are required to evaporate during the process of forming a film and causing it to dry or cure. One factor which has promoted this interest is the realisation that such use of inert diluents is inherently wasteful, but perhaps the most significant factor is the need to reduce atmospheric pollution caused by their evaporation. The achievement of higher contents of film-forming material is, however, subject to difficulties, of which the most immediate is the penalty of high viscosity which is incurred when attempts are made to dissolve a high proportion of film-forming polymer in a small proportion of liquid diluent. This penalty may be avoided or minimised by using film-forming materials of lower molecular weight which are capable of undergoing further polymerisation after application to the substrate, but other difficulties then arise due to the fact that these materials are required to have a high functionality in order to achive an acceptable rate of cure of the film. This in turn gives rise to problems in achieving balanced film properties, and any compromise made to overcome the latter results in inferior mechanical properties or durability. Additionally, application difficulties are found in systems comprising solely low molecular weight resins.

Coating compositions have already been proposed in which part of the film-forming polymer is present as insoluble polymer microparticles; films or coatings prepared from such compositions are of a composite character, having a polymer matrix or continuous phase derived from polymer which was originally in solution, and a disperse phase derived from the microparticles. These proposals have had as their principal objective the useful modification of the mechanical properties, e.g. of impact strength, of the matrix polymer by the presence of the microparticles.

We have now devised coating compositions curable by means of a condensation polymerisation reaction, which contain polymer microparticles and consequently are capable of having very high film-forming solids contents, and yet are not prone to the disadvantages referred to above.

According to the present invention there is provided a coating composition in which the film-forming material consists of:
 (a) from 30% to 85% by volume of disperse phase consisting of particles having a size or size distribution in the range 0.01–20 microns, not less than 50% by volume of those particles being polymer microparticles, and the disperse phase being in a state of stable dispersion as hereinafter defined in
 (b) from 70% to 15% by volume of a liquid continuous phase which is capable of curing to a film-forming polymeric material by means of a condensation polymerisation reaction, the total volume of components (a) and (b) being 100% and the disperse phase being capable of taking part in the said condensation polymerisation reaction.

By "condensation polymerisation reaction" we mean a polymerisation proceeding by a reaction between pairs of functional groups with the formation of a type of inter-unit functional group which is not present in the monomers, the reaction occurring either with or without the evolution of a low molecular weight by-product (this is essentially the definition given by P. J. Flory in "Principles of Polymer Chemistry," Cornell 1953). Liquid resinous systems which cure to a film by means of such a reaction and can therefore be used as a constituent of the continuous phase include those which are commonly referred to as thermosetting resins; there are oligomeric or polymeric materials which on heating can be converted into a solid, film-forming polymer. As examples of thermosetting resins there may be mentioned the so-called phenolic resins which are the products of reaction of phenols with formaldehyde, and the so-called amino resins obtained by the reaction of urea, melamine or other nitrogeneous bodies with formaldehyde. These resins all rely for their thermosetting properties upon the presence of active methylol groups ($-CH_2OH$), which on heating condense either with themselves or with other reactive groups present in the molecule, such as hydroxyl, carboxyl, amide or sulphonamide groups, to form crosslinks whereby the molecular weight of the material is substantially increased, water or formaldehyde being at the same time eliminated. There may also be mentioned the lower alkyl ethers of the amino resins mentioned above, in which some or all of the active methylol groups of the latter are replaced by alkoxymethyl groups ($-CH_2OR$, where R is $C_{1-4}$ alkyl); curing of these ethers takes place analogously to that of the methylol derivatives, but with the elimination of an alcohol instead of water. Although the aforementioned resins are commony cured through the application of heat, certain of them, particularly selected amino resins, can be caused to cure at room temperature by the addition of a suitable catalyst for promoting the condensation polymerisation reaction. Catalysts may also be used even where curing is normally effected by heating. Other resins which cure with the aid of a catalyst either at room temperature or on heating include the epoxy resins, such as those obtained by condensation of bisphenol A with epichlorhydrin. Yet other liquid film-forming systems are known which cure by a condensation polymerisation reaction and are sufficiently reactive to operate at room temperature without the aid of a catalyst; particular mention may be made of the urethane systems based on the reaction of a diisocyanate or polyisocyanate with a polyhydroxy compound. Such systems also may be employed as the basis of the continuous phase.

It will be appreciated from the foregoing description that we include within the scope of the invention both "one-pack" and "two-pack" systems. The one-pack systems are those where the coating composition comprising the essential film-forming components (a) and (b) is supplied in a storage-stable form ready for use and requires only a heating operation to effect curing; an example of such a system is one in which the continuous phase is based on a thermosetting resin. The two-pack systems are those where the complete continuous phase of the composition is produced only shortly before application of the composition to a substrate, by mixing together first and second liquid constituents, and thereafter has only a limited useful life. The second constituent either is a catalyst for the curing reaction to be undergone by the first, as in the case of an acid-catalysed cure of an amino-resin, or actually co-reacts with the first to produce the cured film, as in the case of a hydroxylated polyester and a polyisocyanate, or an epoxy resin and a polycarboxylic compound. In such two-pack systems, the disperse phase (a) may be wholly present in one of the liquid constituents or it may be distributed between the two constituents.

In addition to the essential film-forming components (a) and (b), the compositions of the invention may contain other ingredients not directly contributing to the film obtained on curing; in particular they may contain an inert liquid diluent which is miscible with the continuous phase (b). Such other ingredients are discussed in more detail below.

The polymer microparticles present in the disperse phase of the compositions of the invention are, as will be apparent from the foregoing definition, particles of polymer which are of colloidal dimensions and are insoluble in the continuous phase liquid. The polymer of which the microparticles consist may be either of the addition type, in particular a polymer or copolymer of one or more $\alpha,\beta$-ethylenically unsaturated monomers, or of the condensation type, for example a polyester or a polyamide. Condensation polymer microparticles may be preferred because of their lower cost; in some circumstances, however, depending on the type of application intended, addition polymer microparticles may be more desirable because of their superior colour.

The required insolubility of the polymer microparticles in the continuous phase liquid may be achieved by suitable selection of the composition of the microparticle polymer, that is to say, the polymer may be one which is inherently insoluble in the liquid in question; alternatively, it may be achieved by introducing a sufficient degree of crosslinking into a polymer which, if not crosslinked, would actually be soluble in the continuous phase liquid. Under these last-mentioned circumstances, the microparticles may be swollen to a greater or lesser extent by absorption of the continuous phase liquid, or of a constituent of that liquid, even though they retain their individual identities whilst dispersed therein.

Although the microparticles are thus required to constitute a separate, disperse phase in the coating composition of the invention, they may or may not retain their identity as particles in the cured film which is obtained from the composition after application to a substrate. Under some circumstances, for example where the cured film is required to exhibit a full gloss, it may be advantageous if the microparticles can flow and coalesce during the heat-curing process. Such microparticles will, of course, be in general of the non-crosslinked type. This flowing and fusing together of particles may, where a separate particulate phase is not required in order to provide a modification of mechanical properties, effect an improvement in such properties as clarity of the film and pigment utilisation.

The microparticles may if desired be plasticised with an inert plasticiser which may be either soluble or insoluble in the continuous phase liquid.

The state of stable dispersion in the continuous phase liquid, in which the polymer microparticles are present, is a substantially de-flocculated, sterically stabilised state, achieved by means of a dispersing agent, the molecule of which contains a polymeric component which is solvatable by the continuous phase liquid and another component which is relatively non-solvated thereby and is capable of associating with the surface of the microparticles or preferably of reacting with the polymer contained in those particles. By 'solvatable' is here meant that, if the polymeric component of the dispersing agent were unattached to the remainder of the agent molecule, it would be soluble in the continuous phase liquid wholly as individual molecules. The dispersing agent will itself also be soluble in the continuous phase liquid, but the resulting solution will usually contain both individual molecules and micellar aggregates of molecules, in equilibrium with each other. The type of dispersing agent preferred for use in the invention is a block or graft copolymer containing two types of polymeric component; one type consists, as stated above, of polymer chains which are solvatable by the continuous phase liquid and the other type consists of polymer chains which are of different polarity from the first type, are accordingly not solvatable by that liquid and are capable of becoming anchored to the polymer microparticles. A particularly useful form of such a dispersing agent is a graft copolymer comprising a polymer backbone, which is the non-solvatable or anchor component, and a plurality of solvatable polymer chains pendant from the backbone.

As already stated, the disperse phase of the composition is capable of taking part in the condensation polymerisation reaction undergone by the continuous phase liquid. This capability arises from the presence in either the polymer microparticles per se, or the dispersing agent, or both, of chemically reactive groups which can participate in that reaction. Ways in which such groups may be introduced into either the microparticles or the dispersant will become apparent in the course of the following more detailed description of these two constituents of the disperse phase.

The stable dispersion of the polymer microparticles in the continuous phase liquid may be prepared by dispersing pre-formed polymer particles of suitable size in that liquid in the presence of the dispersing agent. However, the dispersion is more desirably and conveniently obtained by generating the microparticles in situ through a process of dispersion polymerisation of suitable monomers in the presence of the dispersing agent, using as diluent a volatile, inert organic liquid in which the microparticles produced are per se insoluble. The microparticles can if desired subsequently be separated from the resulting dispersion, e.g. by spray drying, and then incorporated with the continuous phase liquid (in which they will become stably dispersed) in order to produce the composition as hereinbefore defined. Alternatively, suitable liquid film-forming material may be added to the dispersion when polymerisation of the monomers is complete and the volatile diluent then removed by distillation, leaving a stable dispersion of the microparticles in that material. However, as discussed below, the presence in the liquid continuous phase of a proportion of an inert liquid diluent is in some cases acceptable and the dispersion of microparticles can under these circumstances be blended directly with the other constituent or constituents of the liquid continuous phase.

Suitable processes of dispersion polymerisation are well known and extensively described in the literature. Thus, so far as the free-radical initiated dispersion polymerisation of $\alpha,\beta$-ethylenically unsaturated monomers is concerned, the procedure is basically one of polymerising the monomers in an inert liquid in which the monomers are soluble but the resulting polymer is not soluble, in the presence dissolved in the liquid of the amphipathic dispersing agent or of a polymeric precursor which, by copolymerisation or grafting with a portion of the monomers, can give rise in situ to such a dispersing agent. Reference may be made, for example, to British Patent Specification Nos. 941,305; 1,052,241; 1,122,397; and 1,231,614 for a general description of the principles involved, as well as to "Dispersion Polymerisation in Organic Media". ed. K. E. J. Barrett (John Wiley & Sons, 1975).

Typical ethylenically unsaturated monomers include acrylic acid and methacrylic acid and their esters such as methyl methacrylate, butyl methacrylate, ethyl acrylate, butyl acrylate, 2-ethyl hexyl acrylate, vinyl esters such as vinyl acetate, the vinyl ester of the mixture of $C_{9-11}$ branched aliphatic acids known as "Versatic acid" (Registered Trade Mark), vinyl chloride, vinylidene chloride, vinyl aromatics such as styrene, vinyl toluene and tertbutyl styrene, acrylonitrile and methacrylonitrile. The production specifically of dispersions of crosslinked addition polymer particles can be achieved by selecting monomers which contain complementary reactive groups in addition to the unsaturated, polymerisable groupings, for example, glycidyl methacrylate or methacrylic acid; by following the procedures particularly described in British Patent Specification Nos. 1,095,288 and 1,156,012, for example, particles are obtained in which there are present such complementary groups which, although not at that stage co-reacted, can be caused to co-react and so form crosslinks by subsequently heating the dispersion to a suitably elevated temperature. Cross-linked addition polymers may also be prepared in dispersion by including in the monomers undergoing dispersion polymerisation a minor proportion of a monomer which is difunctional with respect to the polymerisation reaction, such as ethylene glycol dimethacrylate or divinylbenzene.

The provision in addition polymer microparticles of groups which can take part in the condensation polymerisation reaction undergone by the continuous phase can be arranged by including, in the monomers from which the polymer is derived, one or more monomers carrying such groups. Thus, for example, where the basis of the continuous phase is an amino resin the microparticles can be provided with hydroxyl groups by using as a comonomer in the preparation of the polymer a hydroxymonomer such as a hydroxyalkyl acrylate or methacrylate, for example hydroxyethyl acrylate or hydroxyisopropyl methacrylate. Similarly the microparticle can be provided with carboxyl groups by using acrylic acid or methacrylic acid as a comonomer. Where the microparticle is to be crosslinked and is made as described above by copolymerising monomers containing complementary reactive groups, an excess of one type of such group in the resulting polymer may itself suffice to provide the necessary means of participating in the cross-linking reaction. For example, an excess either of glycidyl methacrylate over methacrylic acid or of methacrylic acid over glycidyl methacrylate would, in the example quoted, satisfy this requirement. The polymer particles may also be made self-crosslinkable at curing temperatures, and at the same time crosslinkable with other components of the composition, by the inclusion of monomers such as N-butoxymethyl (meth) acrylamide.

The production of dispersions of condensation polymers is described, for example, in British Patent Specifications Nos. 1,373,531; 1,403,794 and 1,419,199 and methods of obtaining crosslinked polymer particles are included in these descriptions. The general principles involved here are the same as those referred to above in connection with addition polymer dispersions, but there is a difference of detail arising from the commonly more highly polar nature of the monomers or starting materials from which condensation polymers are derived. This is, namely, that the monomers in question are usually insoluble in the inert liquid in which the polymerisation is to be carried out. Accordingly the first step in the dispersion polymerisation of the monomers is to bring them into a state of colloidal dispersion in the inert liquid, either as liquid or as solid particles. In the second step, polymerisation of the monomers takes place mainly within those same particles. A dispersing agent is required in each stage, firstly in order to stabilise the particles of monomer and secondly in order to stabilise the particles of polymer formed, but in suitable cases a single dispersing agent can be found which will perform both these functions. In place of using a preformed dispersing agent in this process, there may be employed instead a suitable polymeric precursor which, by copolymerisation or grafting with a portion of the monomers being polymerised, can give rise to such a dispersing agent in situ. Reference may be made in this connection to British Patent Application No. 19487/76.

Suitable monomeric starting materials for preparing condensation polymer microparticles are those which are well known for use in making such polymers by melt or solution polymerisation techniques. For example, suitable materials in the case of polyester microparticles are polyhydric alcohols such as ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane pentaerythritol, dipentaerythritol, tripentaerythritol, hexane triol, trimethyl pentane diol, 1,4-cyclohexanedimethanol, oligomers of styrene and allyl alcohol (for example, that sold by Monsanto Chemical Company under the designation RJ 100) and the condensation products of trimethylolpropane with ethylene oxide or propylene oxide (such as the products known commercially as "Niax" triols), in conjunction with polycarboxylic acids such as succinic acid, maleic acid or anhydride, fumaric acid, muconic acid, itaconic acid, phthalic acid or anhydride, isophthalic acid, terephthalic acid, trimellitic anhydride, pyromellitic acid or anhydride, truxinic acid or truxillic acid. It will be understood that where convenient a monomeric ester of any of these acids, such as the dimethyl ester of terephthalic acid, may alternatively be used, in which case methanol is removed as a by-product during the polymerisation. Polyesters may also be made by self-condensation of suitable lactones. In the case of polyamide microparticles, suitable monomeric starting materials are aminocarboxylic acids such as 6-aminocaproic acid or 11-amino-undecanoic acid, or the corresponding lactams, and/or polyamines such as ethylene diamine, propylene diamine, hexamethylene diamine, diethylene triamine, triethylene tetramine or tris(aminomethyl) methane in conjunction with the polycarboxylic acids mentioned above.

It will of course be understood that, in the case of both polyester and polyamide microparticles, the mixture to be polymerised must incorporate some proportion of a starting monomer which has a functionality greater than two, if it is required that the resulting microparticles should be crosslinked.

As with the polymer microparticles of the addition type described earlier, it may be required that condensation polymer microparticles used in the compositions of the invention carry groups capable of taking part in the condensation polymerisation reaction whereby the continuous phase resin is cured. However, owing to the inherent nature of many condensation polymers, in particular polyesters and polyamides, they may already possess suitable groups, in particular hydroxyl, amine or carboxyl groups, as end groups as a result of their mode of preparation. Where additional reactive groups are required, these may be provided, for example, by the inclusion in the materials from which the polymer microparticles are made of monomers of a functionality (with respect to those groups) of greater than two but under conditions such that only branching, not crosslinking and gelation, of the polymer chains can occur.

Where the ability of the polymer microparticles to take part in the condensation polymerisation curing reaction is required to originate in the dispersing agent, the composition of the latter is chosen so that it contains suitable reactive groups in the molecule. These groups, for example hydroxyl or carboxyl groups, may be present in either; the solvatable polymeric component of the dispersing agent; or in the non-solvated 'anchor' component thereof. An example of such a dispersing agent, having reactive hydroxyl groups in the solvatable component, is a graft copolymer obtained by copolymerising methyl methacrylate, methacrylic acid and the glycidyl methacrylate adduct of a copolyester of 12-hydroxystearic acid and dimethylolpropionic acid. An analogous dispersing agent, but one containing reactive groups in the non-solvatable component, may be made by omitting the dimethylolpropionic acid from the foregoing procedure and replacing some of the methyl methacrylate by glycidyl methacrylate or a hydroxyalkyl(meth)acrylate.

An example of a suitable dispersing agent which does not contain any groups capable of participating in the curing reaction is poly(methyl methacrylate-g-tert-butyl styrene) obtained by copolymerising the glycidyl ester of monocarboxy-terminated p-tert-butyl styrene with methyl methacrylate, the former having been obtained by polymerising tert-butyl styrene monomer in the presence of azobis-4-cyanovaleric acid and thioglycollic acid.

A feature of certain of the dispersion polymerisation processes referred to above, in particular those described in British Pat. Nos. 1,231,614; 1,373,531; 1,403,794; and 1,419,199 is that the dispersing agent used contains groupings which are capable of taking part in the polymerisation of the monomers from which the polymer of the microparticles is derived. In the case where that polymer is of the addition type, the dispersing agent may, for example, carry in the molecule a double bond copolymerisable with the unsaturated monomers; in the case of a condensation polymer the dispersing agent may, for example, contain epoxide groups which can co-react with the hydroxyl, carboxyl or amino groups present in the monomers employed. Use of this feature makes it possible to ensure firm anchoring or bonding of the dispersing agent to the surface of the microparticles. Examples of suitable dispersing agents possessing this characteristic are those graft copolymers described above in which the anchoring function is supplemented by the presence in the copolymer backbone of units derived from methacrylic acid.

A cured film prepared from a coating composition according to the invention will contain a high proportion of the polymer microparticles and accordingly the properties of those particles themselves, or of the polymer they contain, will contribute significantly to the mechanical properties of the film. The microparticles may be rubbery or glassy, that is to say their glass transition temperature (Tg) may be below or above ambient temperature respectively, and this will be reflected in the mechanical properties of the final film, especially in those cases where the microparticles retain their identity. Where the polymer is rubbery, an inclusion of rubbery particles may contribute to, e.g. the impact resistance of the cured film. In a case where the microparticles are required to fuse and flow prior to the curing step, it follows that the microparticles should have an environmental Tg below the curing temperature, but the environmental Tg may be lower than the inherent Tg value where the microparticles tend to be swollen or softened by other constituents of the composition, for example a reactive liquid monomer or oligomer as described below. It should be noted that where the composition also contains a non-reactive diluent miscible with the continuous phase liquid, as discussed in more detail below, the microparticles will not fuse with the reactive portion of the continuous phase until substantially all that diluent has been removed; onset of the curing reaction is desirably delayed in such a case until fusion has occurred.

It has previously been stated that the microparticles should have a size or size distribution in the range 0.01–20 microns. In order to obtain high solids compositions, it is useful if the particles are not of uniform particle size distribution; this ensures fluid compositions at higher disperse phase packing fractions. The distribution may be bimodal or polymodal.

Although the disperse phase of the compositions of the invention may consist solely of the polymer microparticles, in which case those particles themselves will constitute from 30% to 85% by volume of the total film-forming material, there may also be present in the disperse phase particles of pigments, fillers or extenders such as are commonly used in coating compositions. Such will preferably be of a size or size distribution which is conventional in the coatings art, for example from 0.1 to 5 microns; they may be either similar or dissimilar in size to the polymer microparticles, but, where they are dissimilar in size to the latter, higher concentrations of disperse phase and hence higher solids contents may be attained through the use of bimodal or polymodal size distributions. Like the polymer microparticles, the pigment, filler or extender particles will be stably dispersed in a deflocculated state in the liquid continuous phase. This state of dispersion may be achieved with the aid of known types of pigment dispersant, but in many cases a constituent of the continuous phase, or a chemical variant thereof, may itself be an effective dispersant. Particularly effective dispersants are those described in British Pat. No. 1,108,261. Alternatively, the pigment may be dispersed in the dispersion of microparticles in inert liquid, where those particles have been obtained by dispersion polymerisation of monomer in that liquid in the manner previously described. In this case, residual amounts of the dispersing agent whereby the microparticles are stabilised will serve also to stabilise the pigment particles, and may additionally render them capable of participating in the condensation polymerisation curing reaction. In both the above techniques, the operation of dispersing the pigment may be carried out in the ways which are conventional in the paint industry; i.e. by the use of ballmills, bead mills, attritors or colloid mills.

Yet another procedure for introducing pigments is that of carrying out the dispersion polymerisation process, whereby the microparticles are obtained, actually in the presence of the pigment. In this way, each microparticle can be caused to incorporate one or more subparticles of pigment. Such techniques of polymer encapsulation of pigments are described, so far as addition polymers are concerned in British Pat. No. 1,156,653 and, so far as condensation polymers are concerned, in British Pat. No. 1,453,713 or in the specification filed in pursuance of British patent application No. 6613/76.

These particles of pigments or like materials may be present in the disperse phase in any amount up to a maximum which is equal in volume to the polymer microparticles present, but the total amount of all these particles will always lie in the range 30% to 85% of the total volume of the film-forming material in the composition. Preferably, in those cases where the disperse phase contains both polymer microparticles and pigment, the microparticles themselves constitute at least 30% by volume of the total film-forming material in the composition.

The other essential film-forming component of the compositions of the invention, is, as already indicated, the liquid continuous phase which is capable of curing to a polymeric film by a condensation polymerisation reaction as hereinbefore defined.

In general, the continuous phase liquid may be either a single liquid substance or a homogeneous liquid mixture of two or more substances. In the case of a mixture, one or more of the constituents may be solid at normal temperatures provided that such a solid constituent is soluble in another constituent which is liquid, and that the mixture as a whole is liquid at normal temperatures. Clearly, where the continuous phase liquid is a single substance, that substance must be a film-forming material capable per se of curing by a condensation polymerisation reaction as previously defined. A number of illustrations of suitable thermosetting resins of the phenolic resin or amino resin types have already been given. Also suitable are addition copolymers of the thermosetting type, provided that they are of sufficiently low molecular weight to be liquid or, alternatively, are soluble in some other, liquid constituent of the continuous phase. Such copolymers include copolymers of alkoxymethyl acrylamide or alkoxymethyl methacrylamide with other vinyl monomers, for example a copolymer of styrene, methyl methacrylate, methacrylic acid, butyl acrylate and butoxymethyl acrylamide containing 20% by weight of the last-mentioned component.

Where the continuous phase liquid is a mixture, alternative possibilities arise. One possibility has already been discussed above, namely that of a "two-pack" coating composition according to the invention. In this case, the continuous phase of the composition is obtained by the admixture, shortly before the composition is to be applied to a substrate, of two liquid constituents which are mutually reactive to form a film by means of a condensation polymerisation reaction but which are not individually capable of curing and film-forming. Particularly suitable systems of this type are those based on hydroxyl group-containing polymers, such as hydroxylated polyesters and polyethers, in conjunction with diisocyanates, such as tolylene diisocyanate, diphenylmethane diisocyanate, hexamethylene diisocyanate and isophorone diisocyanate, or with polyisocyanates such as the isocyanurate trimer of tolylene diisocyanate or the adduct of 1 mol of trimethylolpropane with 3 mols of hexamethylene diisocyanate. Other suitable film-forming systems are those based on an epoxy compound as the one constituent and a polyisocyanate or polyamine as the other.

Each of the two constituents of a two-pack composition may, of course, itself be a mixture of two or more reactive substances of the particular type concerned.

The other possibility is that of a "one-pack" composition in which the continuous phase liquid contains a film-forming material capable per se of curing by a condensation polymerisation reaction but also contains one or more liquid constituents which are not in themselves capable of so curing but are compatible with the film-forming material first mentioned and contain groups which can participate in the said curing reaction. These reactive liquids are required to be of low volatility, which means that they should have boiling points in excess of 150° C., preferably in excess of 200° C., at atmospheric pressure. These constituents of the continuous phase liquid should have good mutual solubility or miscibility characteristics.

In the case where the continuous phase is based mainly on a thermosetting resin as described above, suitable reactive liquids are relatively low molecular weight (e.g. less than 1000) compounds containing free hydroxyl groups. For some systems a simple glycol or polyol, for example 1:4-butanediol may be satisfactory, whilst for others the requirement of miscibility with the film-forming material may call for the use of a hydroxyl-terminated oligomeric ester of a polyhydric alcohol with a polybasic acid and/or a monobasic fatty acid, examples of which include (i) the product of esterification of one mole of adipic acid with two moles of trimethylolpropane, further reacted with one mole of oleic acid (3 OH groups per molecule).

(ii) the product of esterification of one mole of adipic acid with one mole of trimethylolpropane and one mole of hexylene glycol, further reacted with one mole of oleic acid (2 OH groups per molecule).

(iii) the product of esterification of one mole of sebacic acid with two moles of trimethylolpropane, further reacted with two moles of 12-hydroxystearic acid (4 OH groups per molecule).

For yet other systems, a suitable reactive liquid may be obtained by etherifying a polyhydroxy compound with an epoxy compound containing an aliphatic chain of moderate length, for example by reacting trimethylolpropane with the glycidyl ester of a mixture of $C_{9-11}$ branched aliphatic acids known as "Cardura E" (Registered Trade Mark).

Other suitable reactive liquids for use in particular systems will readily be devised by the person skilled in the art, bearing in mind the principal requirements already stated of compatibility with the film-forming material, ability to participate in the reaction whereby the latter undergoes curing, and of relatively low molecular weight with associated low viscosity.

The compositions of the invention may contain, in the continuous phase of the film-forming material, a catalyst for the condensation polymerisation reaction to be undergone by that phase. The amount of such catalyst present will of course vary according to the nature of the film-forming system, and the conditions of temperature and time which it is desired to employ in the curing operation, but in general an amount of from 0.1% to 15% by weight, based on the total film-forming solids present in the continuous phase (including any reactive liquid), is satisfactory. Suitable catalysts are those which are well known in the art, for example where the continuous phase liquid is based mainly on a thermosetting resin, there may be used substances of an acidic nature, or substances which generate an acid on heating, such as methanesulphonic acid, toluenesulphonic acid, dodecylbenzene sulphonic acid, partial esters of maleic acid, phosphoric acid, cyclohexylphosphonic acid, trichloroacetic acid, trifluoroacetic acid and tetrahalogenophthalic acids or partial esters thereof. Normally, the catalyst will be incorporated in the composition at the time of manufacture, but in cases where problems of storage stability are encountered and these cannot be overcome by selection of the type of catalyst or its concentration, the catalyst can be added to the composition just prior to its application to a substrate.

Where, as discussed in detail below, the coating composition contains an inert liquid diluent and it is desired that this diluent should be enabled to evaporate so as to permit flow of the polymer microparticles before curing is effected, it is preferred to use only a small proportion of a catalyst, for example an amount of from 0.1% to 0.5% by weight based on the total resin solids present.

In addition to the essential film-forming components already mentioned, that is to say the disperse phase (a) and the liquid continuous phase (b), the compositions of the invention may contain up to 30% by weight, based on the total composition, of an inert liquid diluent which is miscible with the liquid continuous phase and which volatilises under the conditions of application of the coating composition to a substrate. Expressed in another way, the film-forming content of the compositions may range from 70% to a maximum of 100% by weight.

Suitable inert diluents are liquids of low viscosity, preferably not more than 0.05 poise, which are capable of assisting (or at least do not positively hinder) the achievement of a state of stable dispersion of the disperse phase in the continuous phase. The inert diluent must be of sufficiently high volatility to be readily removed by evaporation from a coating formed from a composition of the invention, either at room temperature or at an elevated temperature as the process of curing the liquid continuous phase may require.

Examples of particularly suitable inert liquids include aromatic or aliphatic hydrocarbons, but other inert liquids of suitable volatility, lack of toxicity and absence of strong odour may be used.

Considerable variation is possible in the detailed choice of compositions according to the invention, depending for example upon the nature of the final coating which is required and the mode of application of the composition. It may be desirable in some instances that the composition should be as free as possible from inert diluent, that is to say it should closely approach a 100% content of film-forming material. In such cases it will be preferred that the liquid continuous phase has a relatively low viscosity, in order to render the composition workable; where it is to be applied to a substrate at around room temperature, a convenient viscosity range is 0.1–25 poise at that temperature. This may be achieved by employing a film-forming material which itself has a viscosity within this range, but alternatively there may be used a film-forming material having a viscosity significantly higher than this, e.g. in the region of 100 poise, if this is blended with a reactive liquid of relatively low viscosity, e.g. of 5 poise or less at room temperature. In certain limited cases, it may be acceptable to reduce the viscosity of a composition based on a viscous film-forming material by the expedient of heating the composition immediately prior to its application to the substrate, but this is not a generally suitable technique. In the above connection, it may be remarked that the complete elimination of inert diluent from the composition may be difficult to achieve by reason of the fact that the polymer microparticles are most conveniently accessible in the form of a dispersion in an inert liquid, as mentioned above. Compositions according to the invention which approach 100% film-forming material content are of particular interest for use in environments where flammability or atmospheric pollution are serious problems.

In other instances, whilst the main objective of the invention of achieving coating compositions of high film-forming solids contents is not ignored, it may be positively desirable to include a limited proportion of inert diluent in order to regulate the application characteristics. Here it is not so important to limit the viscosity of the continuous phase liquid per se because the addition of a small amount of inert liquid diluent can have a marked viscosity-reducing effect. Thus the continuous phase liquid can in these cases if desired consist solely of film-forming material of relatively high viscosity such as is mentioned above, although a low viscosity reactive liquid may of course also be included if this is desirable for other reasons. Compositions containing inert diluent will thus tend to have film-forming material contents lying nearer to the minimum of 70% by weight previously referred to. Such compositions are suitable in particular for the continuous coating of metal coil or for spray application to convoluted surfaces.

The foregoing discussion, regarding the viscosities of the individual constituents of the continuous phase and of the continuous phase as a whole, applies equally to the case where that phase consists of two mutually reactive constituents as it does to the case of a film-forming material in conjunction with a reactive liquid.

It may also be desirable to include in the coating compositions suitable proportions of other agents in order to control properties such as flow, adhesion of the film to a substrate and settlement of the disperse phase in the liquid composition. Such additives, which will normally be incorporated in the continuous phase of the composition, are well known to those skilled in the formulation of coating compositions generally. There may also be added, usually in concentrations of around 30% by weight based on the total film-forming material, a reactive silicone resin (containing, for example, hydroxyl or alkoxy groups) of known types for the purpose of upgrading the weathering performance of the film obtained on curing the composition. Such a resin may be present as a constituent of the continuous phase and/or may be introduced during the later stages of making the polymer microparticles, where the latter are all of the condensation type, so that it then becomes part of the disperse phase.

Preferably the film-forming material in the coating compositions of the invention consists of from 40% to 80% by volume of liquid continuous phase as hereinbefore defined. It will be understood, therefore, that when these preferred ranges apply, the total amount present of polymer microparticles together with any pigment, filler extender particles (including polymer-encapsulated pigment particles) will lie within the above range 40% to 80%.

Coating compositions according to the invention may be applied to a substrate by any of the conventional methods, but they are of particular interest for application by compressed air spray, airless spray at either room temperature or an elevated temperature, electrostatic spray, forward or reverse roller coating or by dip, curtain or flow coating.

After application, curing of the film upon the substrate may be effected under the conditions which are conventional for coating compositions which cure by a condensation polymerisation reaction. In most cases, this will involve heating the film at a temperature in the range 100°-300° C. for a period of time varying from less than one minute at the highest temperatures up to 30 minutes at the lowest temperatures. Where appropriate, in those causes in which a catalyst is introduced just before application, curing may even take place at room temperature. Generally speaking, the conditions required will be similar to those normally employed in the curing of the same film-forming system in a conventional coating composition not containing the polymer microparticles. However, unlike such conventional compositions, the compositions of the invention have much higher film-forming solids contents (70-100% by weight including pigments where present, as compared with 60% solids or lower in most known compositions), and in consequence possess distinct advantages in much reduced release of volatile materials on drying. In addition, they are superior to high-solids coating compositions which have previously been proposed in that a high proportion of the total solids present consists of pre-polymerised, highly functional material (viz. the polymer microparticles), the extent of polymer-forming reactions which are required to take place after application to the substrate being therefore much less than in the composition where the film-forming material consists predominantly of monomeric or oligomeric substances. Their superiority in this respect is manifest in the possibility of building up coatings of a greater thickness in a single application than is possible with known high solids coating compositions, whilst avoiding the penalty of surface shrinkage. The presence of the preferred polymer microparticles also improves the control of the rheology of the composition on application, allows lower curing temperatures to be employed, and yields films of greater solvent resistance and consistency of durability and mechanical properties than can otherwise be achieved.

The invention is illustrated but not limited by the following Examples, in which parts and percentages are by weight.

EXAMPLE 1

A. Preparation of Amphipathic Copolymer Dispersing Agent (a) Preparation of 12-hydroxystearic acid/dimethylolpropionic acid copolyester To a 10-liter reaction vessel fitted with stirrer, nitrogen inlet and a Dean & Stark separator there was charged:

| | |
|---|---|
| 12-Hydroxystearic acid | 5400 g |
| Dimethylolpropionic acid | 402 g |
| Aliphatic hydrocarbon (boiling range 190°-210° C.) | 580 g |
| Methane sulphonic acid | 12 g |

The charge was heated under reflux at 156° C. for 6 hours, removing 312 g of water of reaction. The product was an 89% solution of copolyester having an acid value of 32.5 mgKOH/g and a hydroxyl value of 16.5 mgKOH/g. G.P.C. analysis indicated $\overline{M}_w=4680$ and $\overline{M}_n=2520$ (polystyrene calibration); hence the ratio $\overline{M}_w/\overline{M}_n$ was 1.86

(b) Preparation of glycidyl methacrylate adduct of (a)

To a 4-liter reaction vessel fitted with stirrer, nitrogen inlet and a Dean & Stark separator there was charged:

| | |
|---|---|
| Product (a) above (89% solution) | 2000 g |
| Glycidyl methacrylate | 186 g |
| Dimethylcocoamine | 5.75 g |
| Hydroquinone | 2 g |
| Aliphatic hydrocarbon (boiling range 190°-210° C.) | 80 g |

The charge was heated under reflux for 6 hours giving an 84.5% solution of the adduct having an acid value of less than 0.5 mgKOH/g.

(c) Copolymerisation of adduct (b)

To a 6-liter reaction vessel fitted with stirrer, nitrogen inlet and reflux condenser was charged 1500 g of methyl ethyl ketone. This charge was heated to reflux temperature (80° C.) and there was then added over a period of 2 hours the following feed mixture:

| | |
|---|---|
| Product (b) above (84.5% solution) | 854 g |
| Methyl methacrylate | 736 g |
| Methacrylic acid | 82 g |
| Azodiisobutyronitrile | 8.6 g |
| Primary octyl mercaptan | 8.6 g |

When the feed was completed, there was added a further 1 g of azodiisobutyronitrile and the mixture was refluxed for 2 hours more. To this product was added 2325 g of aromatic hydrocarbon mixture (boiling range 160°-180° C.) and the mixture was then distilled until 163 g of distillate had been collected. There was thus obtained a 40% solution of a 40/54/6 w/w/w copolymer of the adduct (b) with methyl methacrylate and methacrylic acid; G.P.C. analysis (polystyrene calibration) gave $\overline{M}_w=38,100$ and $\overline{M}_n=10,900$, hence $\overline{M}_w/\overline{M}_n=3.5$.

B. Preparation of Polyester microparticle Dispersion

To a 6-liter flask fitted with turbine stirrer, steam-heated condenser and Dean & Stark separator there were charged the following:

| | |
|---|---|
| Isophthalic acid | 623 g |
| Trimethylolpropane | 302 g |
| Neopentyl glycol | 468 g |
| Ethylene glycol titanate | 3.6 g |
| Xylene | As required to achieve reflux |

The charge was heated to reflux temperature (195° C.) and 98 g of water of reaction was removed, giving a clear melt of the isophthalic acid partial esters. After cooling to 140° C., there was added 473 g of adipic acid and the temperature was then raised to 160° C. with stirring. The stirrer was stopped and the following ingredients, preheated to 150° C., were added:

| | |
|---|---|
| 40% solution of copolymer (from (A) above) | 268 g |
| Aliphatic hydrocarbon (boiling range 190°–210° C.) | 880 g |

The stirrer was re-started at high speed in order to emulsify the mixture effectively, and the temperature was raised to reflux at 180°–190° C. Over a period of 3 hours, during which 250 g of water of reaction was removed, there was added at a steady rate the following mixture:

| | |
|---|---|
| 40% solution of copolymer dispersant from (A) above | 100 g |
| Aliphatic hydrocarbon (boiling range 190°–210° C.) | 100 g |

Thereafter diluent was removed by distillation until the residue had a solids content of 75%. The product was a fluid dispersion of particles of size 0.5–5 microns consisting of a 0.54/0.46/0.32/0.64 molar polyester from isophthalic acid/adipic/trimethylolpropane/neopentyl glycol. The particles were found to be swollen by but not soluble in acetone and to have a Tg of −5° C. Their acid value was 18 mgKOH/g and hydroxyl value 91 mgKOH/g.

C. Preparation of Reactive Liquid Oligomer

To a 2-liter reaction vessel fitted with stirrer, nitrogen inlet and Dean & Stark separator was charged:

| | |
|---|---|
| Oleic acid technical | 564 g |
| Trimethylolpropane | 268 g |
| Adipic acid | 296 g |
| Hexane-1:6-diol | 236 g |
| Toluene | As required to achieve reflux of mixture |

(The molar ratios of the reactants were oleic acid/trimethylolpropane/adipic acid/hexane 1.6 diol = 1/1/1/1).

The charge was heated at reflux temperature (190° C.) for 8 hours, with the removal of 113 g of water of reaction. The ester product had a solids content of 93.5%, an acid value of 6.2 mgKOH/g, and a viscosity of 4.6 poise (non-volatile material). G.P.C. analysis (polystyrene calibration) gave $\overline{M}_w = 1430$, $\overline{M}_n = 832$.

D. Preparation of Pigment Dispersion

To a 1-gallon laboratory ball mill was charged:

| | |
|---|---|
| Titanium dioxide pigment (R960 ex. duPont) | 1470 g |
| Pigment dispersant (as described below) | 190 g |
| White Spirit | 190 g |

The charge was milled for 24 hours, to give a particle size below 2 microns (Hegmann gauge).

The pigment dispersant used was a 58% solids solution in white spirit of a copolymer of the adduct (c) described above with vinyl toluene, styrene and glycidyl methacrylate, in which the epoxide groups were subsequently reacted with p-aminobenzoic acid, as broadly described in British Pat. No. 1,108,261.

E. Preparation and Application of Coating Composition

The following ingredients were mixed:

| | |
|---|---|
| Pigment dispersion (D) above | 126 g |
| Reactive liquid oligomer (C) above | 14.8 g |
| Polyester microparticle dispersion (B) above | 75.9 g |
| Melamine-formaldehyde resin ("Resimene 765" ex. Monsanto Chemicals Limited). | 20 g |
| Dodecyl Benzene Sulphonic acid | 0.5 g |

The resulting coating composition had a pigment:binder ratio of 1:1 by weight, a viscosity of 8.5 poise and a solids content of 83.7%. It had the following analysis:

| | Percentage by: | |
|---|---|---|
| | Weight | Volume |
| Polyester microparticles | 25 | 34 |
| Reactive liquid oligomer | 6 | 8 |
| Melamine-formaldehyde resin | 8 | 12 |
| Pigment | 42 | 14 |
| Pigment dispersant | 3 | 4 |
| Inert diluent | 16 | 28 |
| | 100 | 100 |

The viscosity of the liquid continuous phase (i.e. excluding inert diluent) was 10 poise.

The composition was spread, using a wire wound coater bar, to a thickness of 20 microns on a pretreated anodised aluminium panel and then cured for 50 seconds in an oven at 300° C.

The cured coating had the following properties:

| | |
|---|---|
| Reverse impact | 30 inch-lbs |
| Pencil Hardness | F |
| Gloss (60° head) | 59% |

The coating passed the acetone rub test, whereby the film is required to withstand without marking a minimum of 30 rubs with a lambswool pad wetted with acetone.

EXAMPLE 2

A. Preparation of Polyester Microparticle Dispersion

To a 6-liter reaction vessel fitted with a ring-packed fractionating column, stirrer and nitrogen inlet was charged:

| | |
|---|---|
| Dimethyl terephthalate | 535 g |
| Neopentyl glycol | 429 g |

-continued

| | |
|---|---|
| Trimethylolpropane | 276 g |
| Manganous Acetate | 0.5 g |

The charge was heated with stirring to 200° C., and methanol was distilled off up to a column head temperature of about 80° C. (amount recovered, 210 ml; theoretical amount, 202 ml 175 g).

The ring packed column was then exchanged for a steam-heated fractionating column, and there was added 603 g of adipic acid and 3 g of ethylene glycol titanate. These ingredients were melted into the previous reaction mixture. Without stirring, there was then added the following charge, premixed and heated to 100° C.:

| | |
|---|---|
| Aliphatic hydrocarbon (boiling range 190°-210° C.) | 1050 g |
| Aromatic hydrocarbon (boiling range 190°-200° C.) | 350 g |
| 40% solution of copolymer dispersing agent (as described in Example 1(A).) | 413 g |

The stirrer was re-started at high speed in order to emulsify the mixture effectively, and the temperature raised to reflux at 185°–195° C. Over a period of 6 hours, during which 148 g of water of reaction was removed, there was added at a steady rate the following mixture:

| | |
|---|---|
| 40% solution of copolymer dispersant (as described in Example 1(A).) | 280 g |
| Aliphatic hydrocarbon (boiling range 190°-210° C.) | 210 g |
| Aromatic hydrocarbon (boiling range 190°-200° C.) | 70 g |

Thereafter diluent was removed by distillation until the residue had a solids content of 74.6%. The product was a fluid dispersion of particles of size 1–5 microns consisting of a 0.4/0.6/0.59/0.3 molar polyester of terephthalic acid/adipic acid/neopentyl glycol/trimethylolpropane. The particles were found to be swollen by, but not soluble in, acetone and to have a Tg of −6° C. Their acid value was 2 mgKOH/g and hydroxyl value 41.6 mgKOH/g.

B. Preparation of Reactive Liquid Oligomer

To the same apparatus as used in Example 1(C) was charged:

| | |
|---|---|
| Trimethylolpropane | 536 g |
| Oleic acid technical | 564 g |
| Adipic acid | 292 g |
| Toluene | as required to achieve reflux of mixture |

The molar ratio charged was oleic acid/trimethylolpropane/adipic acid 2/2/1. The charge was heated at reflux temperature (185° C.) for 6 hours, with the removal of 109 g of water of reaction. The ester product had a solids content of 87.1%, an acid value of 10.5 mgKOH/g and a viscosity of 11 poise (non-volatile material). G.P.C. analysis (polystyrene calibration) gave $\overline{M}_w = 1600$, $\overline{M}_n = 865$.

C. Preparation and Application of Coating Composition

The following ingredients were mixed:

| | |
|---|---|
| Pigment dispersion (as in Example 1(D) above) | 126 g |
| Reactive liquid oligomer, (B) above | 15.9 g |
| Polyester particle dispersion (A) above | 77.3 g |
| Melamine formaldehyde resin ("Resimene 765" ex. Monsanto Chemicals Ltd) | 20 g |
| Dodecyl benzene sulphonic acid | 0.5 g |

The resulting coating composition had a pigment:binder ratio of 1:1 by weight, a viscosity of 7.7 poise and a solids content of 83.3%. The analyses of the composition by weight and by volume were the same as those stated above in Example 1. The viscosity of the liquid continuous phase (excluding inert diluent) was 9 poise.

The composition was spread using a wire wound coater bar to a thickness of 20 microns on a pretreated aluminium panel and then cured for 35 seconds in an oven at 310° C. The cured coating had the following properties:

| | |
|---|---|
| Reverse Impact | 50 inch lbs |
| Pencil Hardness | H |
| Gloss (60° head) | 61% |

EXAMPLE 3

A. Polymer Microparticle Dispersion

Using the same apparatus and technique as those described in Example 1A, a polymer microparticle dispersion was prepared of molar composition isophthalic acid/adipic acid/trimethylolpropane/neopenttyl glycol 0.65/0.35/0.32/0.64. The dispersant used was also of the same composition as that described in Example 1A. The product was stripped to 76% solids and was found to be of particle size 1–3 microns and to have a Tg of 16° C. The particles were found to be slightly swollen by acetone, indicating that they were significantly crosslinked. The viscosity of the dispersion was 3 poise.

B. Preparation and Application of Coating Composition

The following ingredients were mixed:

| | |
|---|---|
| Polyester microparticle dispersion, (A) above | 134 g |
| Melamine-formaldehyde resin ("Resimene 765" ex. Monsanto Chemicals Ltd.) | 10 g |
| Dodecyl benzene sulphonic acid | 0.25 g |

The resulting composition had a viscosity of 5 poise and a solids content of 74.0 solids. It had the following analysis:

| | Percentage by | |
|---|---|---|
| | Weight | Volume |
| Polyester microparticles | 67 | 63 |
| Melamine-formaldehyde resin | 7 | 7 |

-continued

|  | Percentage by | |
|---|---|---|
|  | Weight | Volume |
| Inert diluent | 26 | 30 |
|  | 100 | 100 |

The viscosity of the liquid continuous phase (excluding inert diluent) was 49 poise.

The composition was spread using a wire coater bar to a thickness of 25 microns on an anodised aluminium panel and then cured for 50 seconds in an oven at 300° C. The cured coating had the following properties:

| Reverse Impact | 30 inch-lbs |
|---|---|
| Pencil Hardness | 2H |
| Gloss (60° head) | 94% |

The coating passed the acetone rub test as described in Example 1, this time withstanding 50 rubs with the pad.

EXAMPLE 4

A. Polymer Microparticle Dispersion

Using the same apparatus and technique as those described in Example 2A, a polyester microparticle dispersion was prepared of molar composition terephthalic acid/adipic acid/trimethylolpropane/neopentyl glycol 0.6/0.4/0.3/0.59. The dispersant used was of the same composition as that described in Example 1A. The product was stripped to 75% solids and was found to be of particle size 0.5-3 microns and to have a Tg of 4° C. The same diluent blend was used as in Example 2A. The particles were found to be slightly swollen by acetone.

B. Reactive Liquid Oligomer

Using the same method as that described in Example 1C, an oligomer was prepared of molar composition oleic acid/trimethylolpropane/adipic acid/neopentyl glycol 1/1/1/1. The ester product had a solids content of 93.6% and the non-volatile material had a viscosity of 8.4 poise.

C. Preparation and Application of Coating Composition

The following ingredients were mixed:

| Polyester microparticle dispersion (A) above | 134 g |
|---|---|
| Reactive liquid oligomer (B) above | 12.3 g |
| Melamine-formaldehyde resin ("Resimene 765" ex. Monsanto Chemicals Ltd) | 15 g |
| Dodecyl benzene sulphonic acid | 0.29 g |

The resulting composition had a viscosity of 5 poise and a solids content of 75.2%. It had the following analysis:

|  | Percentage by | |
|---|---|---|
|  | Weight | Volume |
| Polyester microparticles | 58 | 55 |
| Reactive liquid oligomer | 7 | 7 |
| Melamine-formaldehyde resin | 10 | 9 |

-continued

|  | Percentage by | |
|---|---|---|
|  | Weight | Volume |
| Inert diluent | 25 | 29 |

The viscosity of the liquid continuous phase (excluding the inert diluent) was 9 poise.

The composition was spread to a thickness of 25 microns on a tinplate panel and then cured for 30 minutes in an oven at 150° C.

The cured coating had pencil hardness 2H and gloss 93° (60° head).

EXAMPLE 5

A. Polymer Microparticle Dispersion

A 4-liter reaction vessel was fitted with a turbine stirrer, inert gas inlet, a 12" steam-heated fractionating column and a Dean & Stark separator. To this vessel was charged the following:

| Hydrocarbon, boiling range 180°-210° C. ("Isopar L": Registered Trade Mark) | 514 g |
|---|---|
| Copolymer dispersant solution (as described in Example 1(A) but of 45% solids concentration) | 361 g |
| Phthalic anhydride | 768 g |
| Titanium-ethylene glycol complex | 1 g |

This charge was heated to reflux temperature with rapid stirring, causing the phthalic anhydride to melt and become emulsified in the hydrocarbon. There was then added one half of the following mixture:

| Trimethylolpropane | 140 | g |
|---|---|---|
| 1:4-Butanediol | 325 | g |
| 1:6-Hexylene glycol | 35 | g | followed by addition of the remaining half uniformly over a period of 2 hours. At the beginning of this addition, the reaction mixture had the appearance of a very fine milk-like dispersion, with blue scatter; at the end, the mixture was white and opaque but still a stable dispersion. Heating at reflux temperature was continued for 16 hours, with the removal of water and gradual fall of acid value to a final value of about 44 mgKOH/g. Diluent was then removed by distillation to give a 74.8% solids dispersion of particles of a crosslinked polyester. The viscosity of the dispersion was about 9 poise and the polyester particles were found to be of size 0.5-3 microns (optical microscope) and to have a glass-rubber transition temperature of about 26° C.

B. Preparation of Reactive Liquid Oligomer I

This component was prepared in the manner described in Example 1(C) but with a molar composition lauric acid/trimethylolpropane/succinic anhydride 2/2/1; in this case the lauric acid and the trimethylolpropane were first reacted together to a final acid value of below 5 mgKOH/g and the succinic anhydride was then added and reacted to give a product of 95% solids content with an acid value of 5 mgKOH/g and a viscosity (non-volatile) of 11 poise. G.P.C. analysis (polystyrene calibration) indicated $\overline{M}_w=1620$, $\overline{M}_n=985$.

Preparation of Reactive Liquid Oligomer II

This alternative reactive liquid oligomer was made by reacting trimethylolpropane and the glycidyl ester of a $C_{9-11}$ branched aliphatic acid known commercially as "Cardura E" (Registered Trade Mark) in the molar ratio of 1:2; the trimethylolpropane was charged to a reactor together with a quantity of boron trifluoride etherate equivalent to 0.5% of the glycidyl ester to be used These ingredients were heated to 100° C. and the glycidyl ester was added with stirring over a period of 45 minutes, the temperature being maintained throughout at about 100° C. Sufficient xylene was added to the product to bring it to a solids content of 95% and this material had a viscosity of about 75 poise.

C. Preparation and Application of Coating Compositions

Compositions (i) and (ii) were made up as follows:

|  | A | B |
|---|---|---|
| Polyester microparticle dispersion (as described above) | 7.75 | 7.75 |
| Reactive liquid oligomer I | 1.05 | — |
| Reactive liquid oligomer II | — | 1.05 |
| Hexamethoxymethylmelamine ("Cymel * 300") | 4.00 | 4.00 |
| p-Toluenesulphonic acid (50% solution in ethylene glycol) | 1.6 | 1.6 |

* Registered Trade Mark.

Diluent was added to both compositions to bring composition (i) to a final solids content of 75% and a viscosity of 12.5 poise, and composition (ii) to a final solids content of 74.5% solids and a viscosity of 27 poise.

Compositions (i) and (ii) were then spread using a wire wound coater bar, and the coatings obtained had the following characteristics:

|  | (i) | (ii) |
|---|---|---|
| Acetone rub test (air dry, 2 days) | 12 | 15 |
| Acetone rub at 60°, 30 minutes | 15 | 30 + |
| Pencil Hardness | 3B | F |

The films obtained were clear and glossy, that from composition (i) being tough and elastic and that from composition (ii) being hard and tough.

The two compositions had the following ultimate analyses:

|  | (i) | | (ii) | |
|---|---|---|---|---|
|  | Weight | Volume | Weight | Volume |
| Polyester microparticles | 36.5 | 34 | 37 | 34.5 |
| Reactive liquid oligomer | 6 | 6 | 6 | 6 |
| Melamine-formaldehyde resin | 25 | 23.5 | 25 | 23.5 |
| Catalyst | 7.5 | 7 | 7.5 | 7 |
| Inert diluent | 25 | 29.5 | 25.5 | 30 |

The viscosities of the liquid continuous phases (i.e. excluding inert diluent) were (i) 18 poise and (ii) 42 poise.

EXAMPLE 6

A. Polymer Microparticle Dispersion

To a 4-liter reaction vessel equipped with stirrer and condenser there was charged the following:

| Aliphatic hydrocarbon, boiling range 170°–210° C., aromatics 5% ("Shellsol* T") | 12.1 | parts |
|---|---|---|
| Hexane | 3.0 | " |
| Heptane | 15.8 | " |

*Registered Trade Mark

This mixture was heated to reflux temperature (about 100° C.) and the following premixed charge was added:

| Methyl methacrylate | 0.97 | part |
|---|---|---|
| Methacrylic acid | 0.02 | " |
| Azodiisobutyronitrile | 0.08 | " |
| Graft copolymer dispersant solution (see below) | 0.36 | " |

After the total mixture had been maintained at reflux temperature for ½ hour, when a fine white seed dispersion formed, the following further premixed charge was fed over a period of 3 hours:

| Methyl methacrylate | 18.46 | parts |
|---|---|---|
| Methacrylic acid | 0.19 | " |
| Glycidyl methacrylate | 0.19 | " |
| Azodiisobutyronitrile | 0.25 | " |
| Graft copolymer dispersant solution (see below) | 3.88 | " |
| Dimethylaminoethanol | 0.04 | " |

The reaction mixture was then held at reflux temperature for 3 hours and sufficient diluent was thereafter removed by distillation to give a final solids content of 68%. The particles of crosslinked polymethyl methacrylate thus obtained in dispersion were of 0.2–0.4 micron in size; they had a gel content of 75% and a glass-rubber transition temperature of about 105° C.

The graft copolymer dispersant used in the above preparation was obtained by copolymerising the glycidyl methacrylate adduct of poly(12-hydroxystearic acid) with methyl methacrylate and methacrylic acid in the weight ratios of 33:63:4 respectively. It was employed as a 33% solids solution in heptane.

B. Preparation and Application of Coating Composition

The following ingredients were blended:

| Polymer microparticle dispersion (as described in (A) above) | 8.8 | parts |
|---|---|---|
| 1:4-Butanediol (viscosity 0.3 poise) | 2.0 | " |
| Melamine-formaldehyde resin ("Resimene* 765") | 2.0 | " |
| Dodecylbenzene sulphonic acid | 0.05 | part |

*Registered Trade Mark.

Hydrocarbon diluent was then added to bring the solids content of the blend to 76.9% and its viscosity to 5.6 poise. A panel was coated with the composition to a thickness of 3 microns and the coating was stoved for 50 seconds at 290° C. A clear, glossy film resulted which had a hardness of over 4H and withstood over 30 acetone rubs.

The composition had the following analysis:

|  | Weight | Volume |
|---|---|---|
| Polymer microparticles | 46 | 41 |
| Reactive liquid | 15.5 | 15 |
| Melamine-formaldehyde resin | 15.5 | 15 |
| Inert diluent | 23 | 29 |

The viscosity of the liquid continuous phase (i.e. excluding inert diluent) was 4 poise.

EXAMPLE 7

A dispersion of nylon 11 in hydrocarbon was prepared as described in Example 3 of British Patent Specification No. 1,419,199. The dispersion had a solids content of 65%.

A coating composition was prepared by blending the following:

| Nylon 11 dispersion | 9.21 | parts |
|---|---|---|
| Reactive liquid oligomer II (as described in Example 5(B) above) | 1.05 | " |
| Melamine-formaldehyde resin ("Resimene 765") | 3.00 | " |
| Dodecylbenzene sulphonic acid | 0.05 | " |

The blend had a viscosity of 8.6 poise at 75.3% solids.

A film of thickness 2 microns was spread by wire wound coater bar and stoved for 50 seconds at 290° C. The coating obtained was clear and glossy, tough and elastic; it had a pencil hardness of 4B and withstood 24 acetone rubs.

The composition had the following analysis:

|  | Weight | Volume |
|---|---|---|
| Polymer microparticles | 45.5 | 42 |
| Reactive liquid oligomer | 7.5 | 7 |
| Melamine-formaldehyde resin | 22.5 | 21.5 |
| Inert diluent | 24.5 | 29.5 |

The viscosity of the liquid continuous phase (i.e. excluding inert diluent) was 45 poise.

EXAMPLE 8

This Example illustrates a two-pack coating composition of the polyurethane type.

The following two coating compositions were prepared:

|  | A | B |
|---|---|---|
| Polymer microparticle dispersion (as described in Example 5) | 10.2 | 8.1 |
| Reactive liquid oligomer I (as described in Example 5) | 3.8 | — |
| Reactive liquid oligomer II (as described in Example 5) | — | 2.2 |
| Polyisocyanate solution (see below) | 5.7 | 5.7 |
| Zinc octoate solution (8% Zn) | 0.2 | 0.2 |

The zinc octoate was added immediately prior to application of the compositions, which was effected by gap spreader followed by stoving at 60° C. for 30 minutes. The resulting film from both compositions A and B were clear, glossy and hard and withstood over 25 acetone rubs.

The analysis of the compositions were as follows:

|  | A | | B | |
|---|---|---|---|---|
|  | Weight | Volume | Weight | Volume |
| Polymer microparticles | 38.5 | 37.5 | 36.5 | 35.5 |
| Reactive liquid oligomer | 19 | 13.5 | 18 | 13 |
| Isocyanate component | 20 | 24 | 19 | 23.5 |
| Catalyst | 1 | 1 | 1 | 1 |
| Inert diluent | 21.5 | 23 | 25.5 | 27 |
| Solids content | 78.5 | — | 77 | — |
| Viscosity | 12 poise | | 15 poise | |

The polyisocyanate solution used in the above example was a solution of an aliphatic polyisocyanate commercially known as "Desmodur KL5-2426" (Registered Trade Mark), having a solids content of 70% and an isocyanate content of 11.5% (isocyanate equivalent 365).

EXAMPLE 9

A polyester dispersion of solids content 60.5% and disperse phase molar composition isophthalic acid-/acipic acid/trimethylolpropane/neopentyl glycol 0.5/0.5/0.2/0.8 was prepared by the technique described in Example 1 (the diluent used was a 50/50 blend of aliphatic hydrocarbon of boiling range 190°-210° C. and aromatic hydrocarbon of boiling range 190°-210° C.). The following values for the polyester were found by G.P.C. (polystyrene calibration): $\overline{M}_w = 30300$, $\overline{M}_n = 3250$. The polymer was soluble in acetone and hence not crosslinked.

A pigment millbase was made by grinding in a ¼ gall. laboratory ball mill, using steatite balls, the following:

Polyester dispersion (as above) 55.7 parts
Titanium dioxide (Runa RH 472) 44.3 parts A reactive liquid oligomer was prepared by condensing oleic acid, succinic acid, trimethylolpropane and 1:6-hexylene glycol in the molar ratios 1/1/1/1; this product had an acid value of 8 mgKOH/g and a viscosity (non-volatile) of 6 poise. It was used as a 95% solids solution.

A coating composition was prepared by blending:

| Pigment millbase (as above) | 10 | parts |
|---|---|---|
| Melamine-formaldehyde resin (83% solids : see below) | 2.2 | parts |
| Reactive liquid oligomer | 1.1 | parts |
| Dodecylbenzene sulphonic acid | 0.05 | part |

The melamine-formaldehyde resin used in the above blend was a highly butylated polymeric material with molecular weights as determined by G.P.C. (polystyrene calibration): $\overline{M}_w = 6200$, $\overline{M}_n = 1890$. This resin was made in xylene/butanol mixture but was transferred before use into aliphatic hydrocarbon of boiling range 150°-170° C. to give a solution of 83% solids.

The coating composition had a solids content of 80.5%, and the following viscosity characteristics:

| Temperature | Viscosity | Method of measurement |
|---|---|---|
| 25° C. | 31 poise | Standard high shear cone-and-plate viscometer |
| 50° C. | 5.4 poise | Variable temperature low shear cone-and-plate viscometer |
| 75° C. | 3.4 poise | |

A panel coated with this composition and then stoved for 30 minutes at 150° C. was found to have a gloss value of 74% measured on a 60° meter, a hardness of 2 H and to be resistant to acetone.

The composition had the following analysis:

|  | Weight | Volume |
| --- | --- | --- |
| Polymer microparticles | 25.5 | 32.5 |
| Pigment | 33.5 | 10 |
| Reactive liquid oligomer | 8 | 10 |
| Melamine-formaldehyde resin | 13.5 | 17.5 |
| Inert diluent | 19.5 | 30 |

EXAMPLE 10

A dispersion of polyethylene terephthalate particles was prepared by the method described in Example 4 of British Patent Specification No. 1,419,199. The product was concentrated by distillation to give a solids content of 63%; the particle size was 0.5–2.0 microns.

A blend was prepared of the following composition:

| Polyester dispersion (as above) | 9.5 parts |
| --- | --- |
| Epoxy resin ("Epikote* 815") | 4.0 parts |
| Polyamide resin ("Versamid* 140") | 2.1 parts |

*Registered Trade Mark.

The above blend had a solids content of 77.4% and viscosity 1.6 poise. The viscosity of a blend of the epoxy resin and the polyamide resin alone was 22 poise.

A panel was spread with the above composition and stoved at 120° C. for 30 minutes. The resulting film was hard and resisted over 25 acetone rubs.

The composition had the following analysis:

|  |  | Weight | Volume |
| --- | --- | --- | --- |
| Polymer microparticles |  | 38.5 | 36.5 |
| Epoxy resin | Reactive | 25.5 | 24 |
| Polyamide resin | liquid | 13.5 | 13 |
| Inert diluent |  | 22.5 | 26.5 |

We claim:

1. A coating composition in which the film-forming material consists of:
   (a) from 30% to 85% by volume of disperse phase consisting of particles having a size or size distribution in the range 0.01–20 microns, not less than 50% by volume of those particles being polymer microparticles, and the disperse phase being in a state of stable dispersion in
   (b) from 70% to 15% by volume of a liquid continuous phase which is capable of curing to a film-forming polymeric material by means of a condensation polymerisation reaction, the said state of stable dispersion being a substantially de-flocculated, sterically stabilised state achieved by means of a dispersing agent the molecule of which contains a polymeric component which is solvatable by the continuous phase liquid and another component which is relatively non-solvated thereby and is capable of associating with the surface of the microparticles, the total volume of components (a) and (b) being 100% and the disperse phase being capable of taking part in the said condensation polymerisation reaction.

2. A composition as claimed in claim 1, wherein the disperse phase particles are stably dispersed in the continuous phase liquid by means of a graft copolymer dispersing agent comprising a polymer backbone which is not solvated by the continuous phase liquid and is capable of becoming anchored to the polymer microparticles and a plurality of polymer chains pendant from the backbone which are solvatable by the continuous phase liquid.

3. A composition as claimed in claim 1, wherein the stable dispersion of the polymer microparticles is obtained by dispersion polymerisation of suitable monomers in the presence of the dispersing agent, in a volatile, inert organic liquid in which the microparticles produced are insoluble.

4. A composition as claimed in claim 1, wherein the polymer microparticles are composed of a crosslinked polyester.

5. A composition as claimed in claim 1, wherein the film-forming material present in the continuous phase liquid comprises a melamine-formaldehyde resin.

6. A composition as claimed in claim 1, wherein the continuous phase liquid contains, in addition to the film-forming material, one or more reactive liquid constituents which are not in themselves capable of curing by a condensation polymerisation reaction but are compatible with the said film-forming material and contain groups which can participate in the curing thereof by the said reaction.

7. A composition as claimed in claim 6, wherein the continuous phase liquid comprises mainly a melamine-formaldehyde resin and the reactive liquid is a relatively low molecular weight compound containing free hydroxyl groups.

8. A composition as claimed in claim 1, wherein the continuous phase of the composition is obtained by the admixture, shortly before the composition is to be applied to a substrate, of two liquid constituents which are mutually reactive to form a film by means of a condensation polymerisation reaction but which are not individually capable of curing and film-formation.

9. A composition as claimed in claim 1, wherein the continuous phase liquid has a viscosity in the range 0.1 to 25 poise.

10. A composition as claimed in claim 1, wherein, in addition to the disperse phase (a) and the liquid continuous phase (b), there is present up to 30% by weight, based on the total composition, of an inert liquid diluent which is a solvent for the continuous phase and which volatilises under the conditions of application of the composition to a substrate.

* * * * *